United States Patent [19]

Pirovano

[11] Patent Number: 4,887,550
[45] Date of Patent: Dec. 19, 1989

[54] TROLLEY FOR DISTRIBUTING FEED INTO A RECTILINEAR TROUGH IN A POULTRY FARM

[76] Inventor: Camillo Pirovano, 22052 Cernusco, Lombardone, Como, Italy

[21] Appl. No.: 174,341

[22] Filed: Mar. 28, 1988

[30] Foreign Application Priority Data

Apr. 23, 1987 [IT] Italy ............................... 20222 A/87

[51] Int. Cl.$^4$ ........................................... A01K 39/014
[52] U.S. Cl. .................................. 119/56.2; 119/57.6
[58] Field of Search ............. 119/52 B, 52 AF, 56 R, 119/18; 222/608, 613

[56] References Cited

U.S. PATENT DOCUMENTS

| | | | |
|---|---|---|---|
| 2,794,421 | 6/1957 | Rose et al. ...................... | 119/52 AF |
| 2,794,578 | 6/1957 | Saxe ..................................... | 222/240 |
| 3,199,493 | 8/1965 | Hart ................................ | 119/52 AF |

FOREIGN PATENT DOCUMENTS

7316391  6/1975  Netherlands ...................... 119/52 B

Primary Examiner—Robert P. Swiatek
Assistant Examiner—Nicholas D. Lucchesi
Attorney, Agent, or Firm—Stevens, Davis, Miller & Mosher

[57] ABSTRACT

A travelling trolley-plus-container for distributing feed into a channel-shaped rectilinear trough, in a poultry farm, of the type cooperating with a stationary wire rope carrying interspaced disks (or other equivalent elements) to which can be applied removable, shutter-type sleeves so as to cause the controlled release, through a delivery mouth, of successive doses of feed at pre-set points in the poultry farm, wherein to the wire rope is coupled a toothed wheel solid with which is a rotor with radial vanes, between which vanes the feed arrives by free fall. The rotor is housed within a matching seat which is provided at the base of the container and which features the delivery mouth.

7 Claims, 4 Drawing Sheets

TROLLEY FOR DISTRIBUTING FEED INTO A RECTILINEAR TROUGH IN A POULTRY FARM

The present invention relates to an improved travelling trolley for distributing feedstuff into a rectilinear trough in a poultry breeding establishment, particularly but not exclusively for birds in which the birds are housed in rows of cages at different levels.

As is well-known to persons skilled in the art, farms of the aforesaid type comprise a plurality of cages in side-by-side arrangement, on several levels, in front of which, at each level, there extends a rectilinear channel-shaped feeding trough which the birds can reach for feeding purposes by extending their necks outside the cage.

The feed is supplied to each rectilinear trough by means of a respective trolley-plus-container which travels the length of the trough through the agency of a guided control system. The feed is delivered from the base of the container disposed just above the rectilinear trough, through a delivery mouth.

In breeding farms of the kind in question there are two basic problems requiring solution. The first of such problems relates to the distribution of a constant dose of feed along the entire length of the trough, proximal to each cage. The second problem regards wastage of feed that is distributed proximal to empty cages, or cages containing fewer birds than is normally the case as a result, for instance, of mortality.

It is also necessary, especially with certain types of feed, to avoid the formation of "bridges" or build-ups upstream of the delivery mouth, since they are impediments to the correct distribution of feed into the underlying rectilinear trough.

With the aim of distributing constant doses of feed and of avoiding the distribution of feed at empty cages or cages containing fewer birds than is normally the case, there has been proposed a trolley controlled to move along a stationary wire rope carrying interspaced disks (or other similar or equivalent elements) which traverse the trolley in the region of its closed base, passing through coaxial bores on opposie sides of the trolley. In this manner the relative movement between wire rope and trolley is supposed to assure delivery of pre-set doses of feed, through one of the bores, wherein each dose is determined by the volume existing between two successive disks on the wire rope.

In order to prevent pointless distribution of feed when not necessary, one or more removable sleeves can be applied between successive disks on the wire rope; these sleeves prevent the feed from filling the volume between successive disks and, as a result, when the trolley passes above the said sleeves the delivery of feed from the lateral bore will be interrupted.

A trolley of such type is for example described and illustrated in Italian patent application 12010 A/86 filed on Apr. 18, 1986 in the name of Giovanni Briganti.

However, such proposal has shown itself to be satisfactory only when certain, limited types of feed are employed, while with other feeds it has been impossible to prevent formation of the previously mentioned "bridges" and the blocking of the system consequent to the wedging of feed between disks and container—with resulting interruption of distribution—or else non-constant doses of feed being distributed.

In addition, when the systems of the known art are used, the doses can only be adjusted within very limited ranges.

The object of the present invention is to obviate the disadvantages of the known art and provide a travelling trolley of the aforesaid type cooperating with a stationary wire rope carrying disks or other equivalent or similar elements. To attain such object, the invention embodies a travelling trolley-plus-container for distributing feed into a channel-shaped rectilinear trough. In bird breeding establishments, the travelling trolley-plus-container is cooperating with a stationary wire rope carrying interspaced disks to which can be applied shutter sleeves in order to cause controlled release through a delivery mouth of successive doses of feed at pre-set points in the bird farm, there is coupled to the said wire rope a toothed wheel fixed to a rotor featuring radial vanes between which the feed arrives by free fall. The rotor is housed in a matching seat on the base of the container, which seat features the delivery mouth.

The structural and functional characteristics of the invention, and its advantages over the known art, will become more apparent from an examination of the following description, referred to the appended diagrammatic drawings which show an example of a travelling trolley-plus-container embodied according to the principles of the invention. In the drawings.

Figure 1:
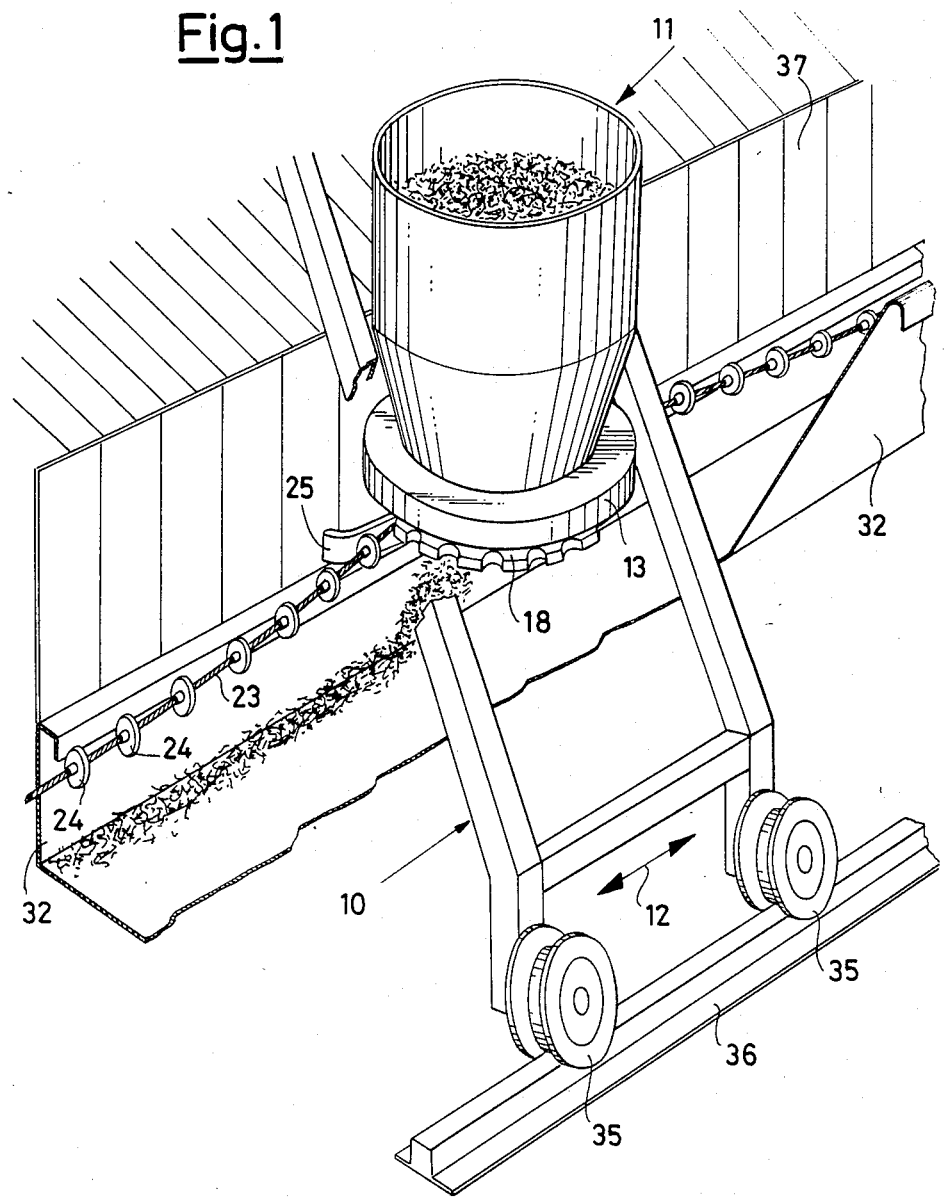
FIG. 1 is a diagrammatic perspective view illustrating a trolley in accordance with the invention.

With reference to the drawings, the travelling trolley-plus-container 10 can be controlled to travel to and fro in a guided manner in the directions indicated by the arrow 12 (FIG. 1) through the intermediary of a control system (not shown).

The trolley 10 is provided, both in its lower and in its upper portions, with wheels 35 engaging a respective rail 36.

In FIG. 1, only the lower wheels and rail are illustrated. On each trolley 10 is mounted a plurality of containers 11, one for each superimposed row of cages 37.

FIG. 1 shows a single container 11 with a relative row of cages 37.

According to the invention, the container 11 terminates in its lower portion in a circular box-like body 13, in which is housed a rotor 14 with radial vanes 15.

The rotor 14 rotates on a pin 16 housed within a hub 17 fixed to the body 13, to which pin 16 a toothed wheel 18 is also fixed.

Also fixed to the rotor 14 is a shaft 19, coaxial with the pin 16, extending vertically within the container 11 and supporting an idle conical body 20 the purpose of which will be made clear hereinafter.

Figure 2:
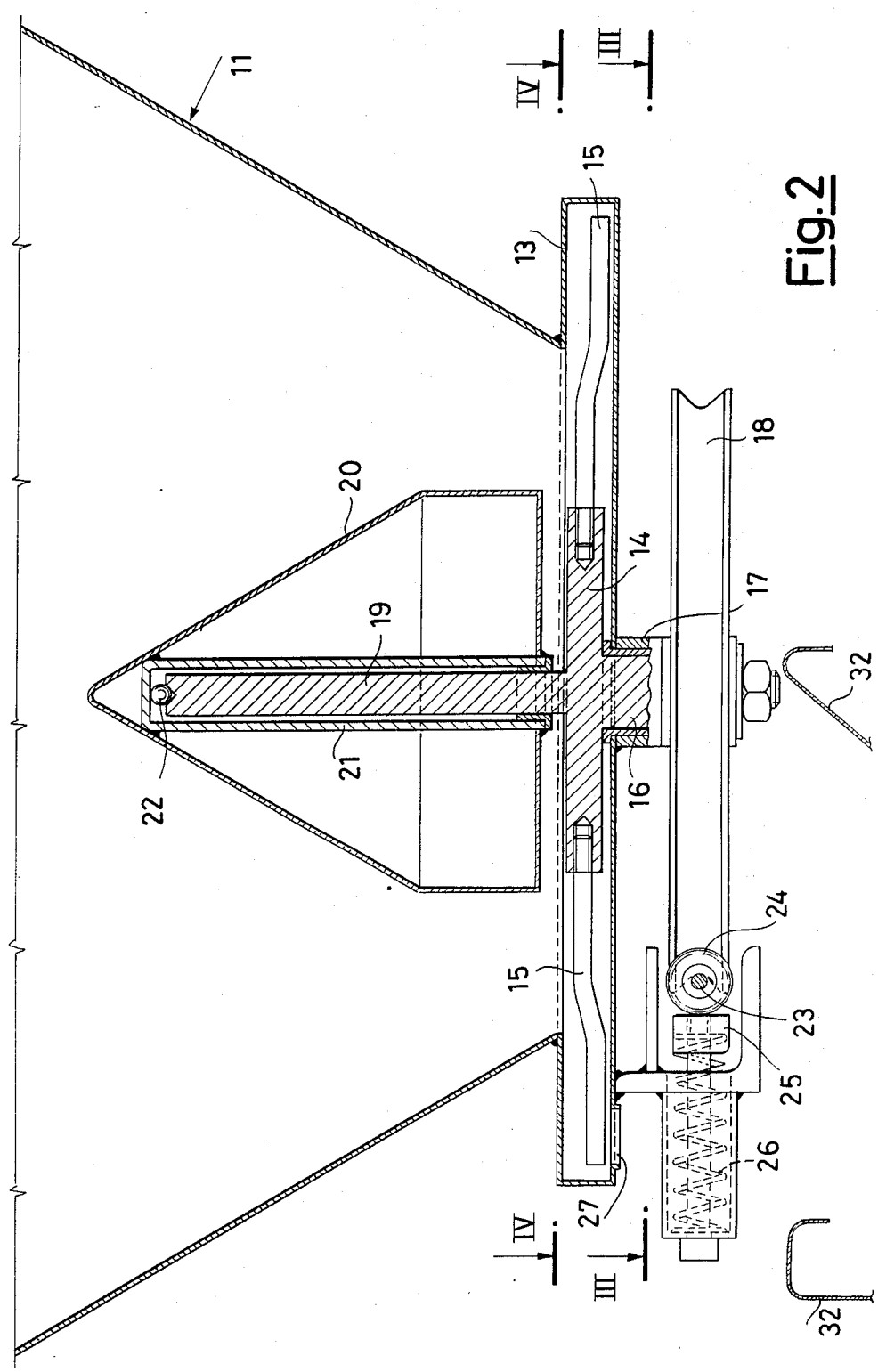
FIG. 2 is a vertical section illustrating the trolley of FIG. 1.

As can clearly be seen from FIG. 2 of the drawings, the conical body 20 is placed on the shaft 19 by means of a sleeve 21 with interposed ball 22.

Figure 3:
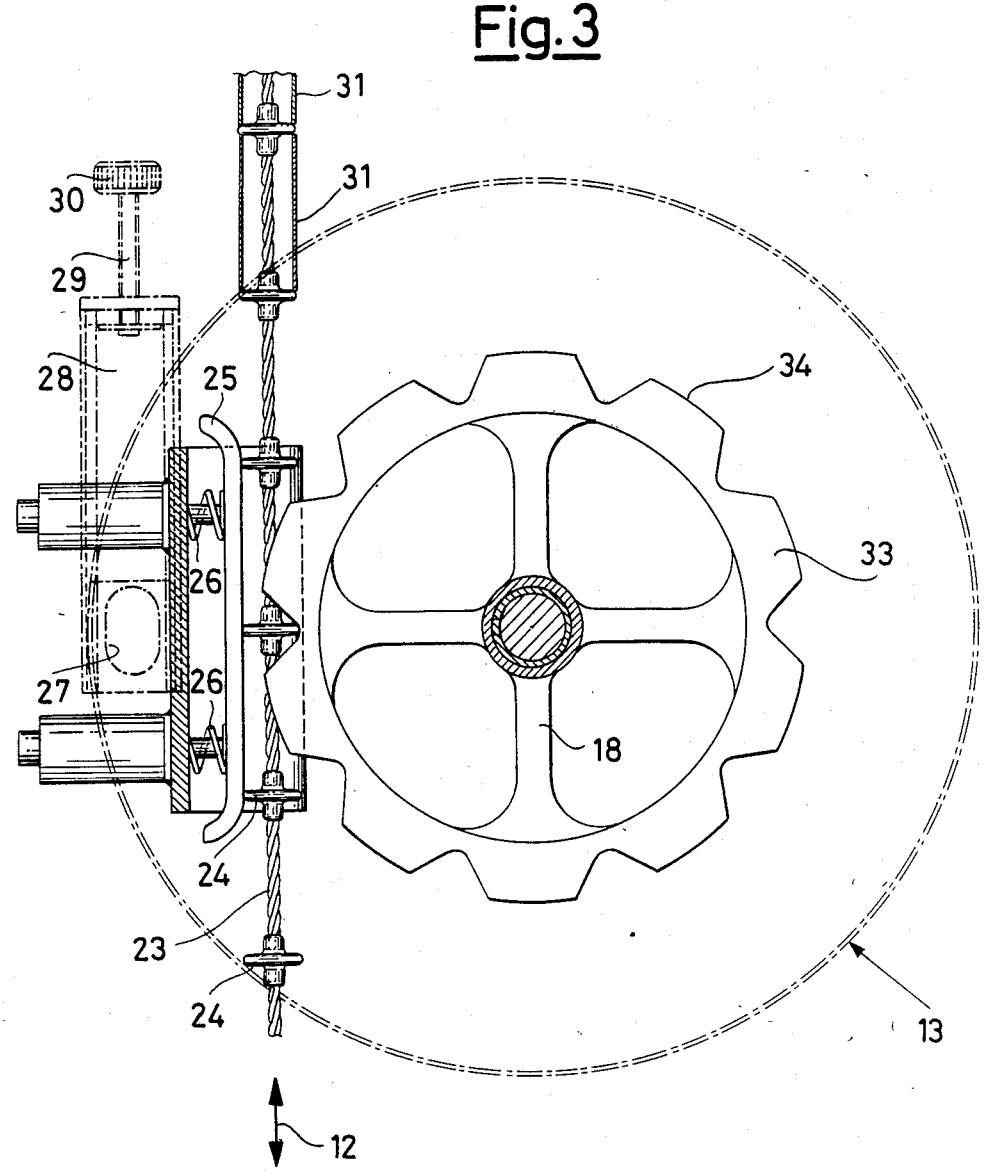
FIG. 3 is a plan view taken through the line III—III of FIG. 2.
Figure 4:
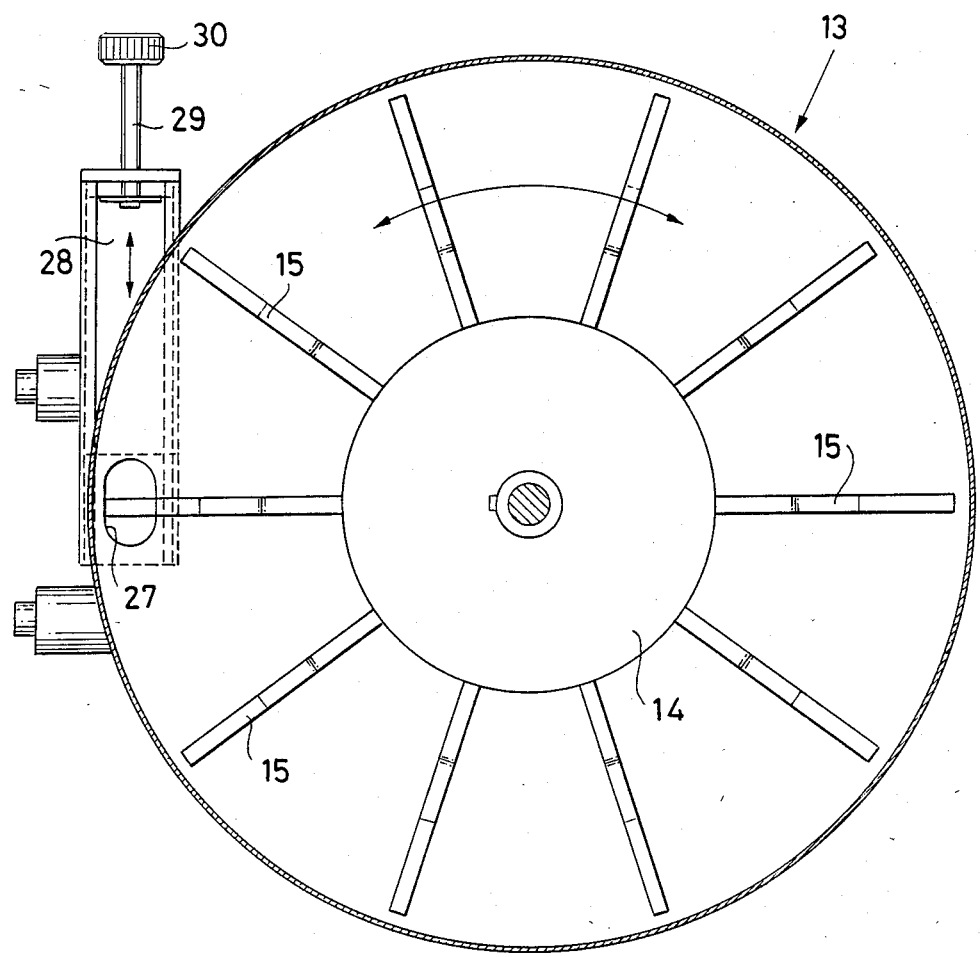
FIG. 4 is a plan view taken through the line IV—IV of FIG. 2.

The toothed wheel 18 is coupled to a stationary wire rope 23 of the type carrying interspaced disks 24, well-known in the art. Correct engagement of the disks 24 with the toothed wheel 18 is assured by means of a sliding block 25 which acts on the disks 24 through the agency of elastically yielding means, for example a pair of springs 26. Between the disks 24 of the wire rope 23 there can be applied removable sleeves 31 (FIG. 3) for the purpose that is set out hereinafter.

The box-like body 13 also features a mouth 27, proximal to its outer periphery, through which the feed is delivered. The width of the mouth 27 can be varied by means of a shutter 28 controlled by a regulation screw 29 with manual control knob 30.

Briefly, the manner of functioning of the travelling trolley in accordance with the invention is as described below.

The translation of the trolley 10 in one of the two directions indicated by the arrow 12 will clearly cause, through the agency of the wire rope 23, the rotation of the tooth wheel 18 and thus also of the rotor 14 and vanes 15. In consequence, the feed reaching the interior of the circular box-like body 13 between the successive vanes 15 by free fall from the container 11 will be discharged through the delivery mouth 27 so as to supply constant successive doses into the underlying rectilinear trough 32 set in front of the row of cages 37.

When, on the other hand, the toothed wheel 18 encounters one or more sleeves 31 pre-disposed at pre-set points of the bird breeding establishment, its rotation will be momentarily arrested, thus causing a temporary stoppage of the distribution of feed through the delivery mouth 27 when such distribution is unnecessary, for example in the case of empty cages or cages housing fewer than the normal number of birds. As will be evident, the arrest of the rotation of the toothed wheel 18 will be determined by the disengagement of its teeth 33 from the disks 24 caused by the presence of the sleeves 31 on which the crests 34 of the teeth 33 run without transmitting any rotational movement of the toothed wheel itself. In addition, the rotation of the vanes 15 unerringly prevents, as will be evident, the formation of "bridges" of feed, the load of which on the rotor 14 is reduced as a result of the presence of the conical body 20. Moreover, owing to the separation of the wire rope 23 from the container 11, and thus also from the feed, jamming of any kind due to wedging of relatively large pieces of feed between the diks and the body of the container 11 is avoided.

I claim:

1. Travelling trolley-plus-container for distribution of feed into a channel-shaped rectilinear trough, in bird breeding establishments, of the type cooperating with a stationary wire rope carrying interspaced disks to which can be applied removable, shutter-type sleeves in order to cause controlled release, through a delivery mouth, of successive doses of feed at pre-set points of the bird breeding establishment a toothed wheel to which said wire rope is coupled fixed to a rotor with radial vanes between which the feed arrives by free fall, the said rotor being housed within a matching seat which is provided at the base of the said container and which features the said delivery mouth.

2. Trolley-plus-container as described in claim 1, wherein the said seat has a circular box-like shape and said toothed wheel coupled to the disk-carrying wire rope is located outside and below the said seat.

3. Trolley-plus-container as described in claim 1, including elastically yielding thrust means acting on the said disks in order to maintain them in engagement with the said toothed wheel.

4. Trolley-plus-container as described in claim 3, wherein the said thrust means comprise a sliding block urged by springs against the said disks.

5. Trolley-plus-container as described in claim 1, including an idly mounted cone above the said rotor, internally of the container for reducing the load of the feed positioned.

6. Trolley-plus-container as described in claim 5, including a ball and wherein said rotor has a shaft extending therefrom and said cone has an internal sleeve, said sleeve being mounted on said shaft with said ball interposed between said shaft and said sleeve.

7. Trolley-plus-container as described in claim 1, including a gate valve to control the said delivery mouth.

* * * * *